March 29, 1938.  L. H. BURNHAM  2,112,733

TRANSFORMER

Filed Sept. 26, 1936

Inventor:
Locke H. Burnham,
by Harry E. Dunham
His Attorney.

Patented Mar. 29, 1938

2,112,733

UNITED STATES PATENT OFFICE 2,112,733

TRANSFORMER

Locke H. Burnham, Pittsfield, Mass., assignor to General Electric Company, a corporation of New York Application September 26, 1936, Serial No. 102,723

2 Claims. (Cl. 175—361)

My invention relates to transformers and, more particularly, to that type of transformer which is immersed in an insulating and cooling liquid.

The losses in a transformer appear as heat, which increases the temperature of the transformer, and the maximum load capacity of the transformer is limited by the maximum temperature which it can safely withstand without injury. The maximum capacity of the transformer can be increased by increasing the rate at which the heat is dissipated. The general object of the present invention is to provide an improved arrangement for rapidly and effectively dissipating the heat from a liquid-immersed transformer.

Figure 1:
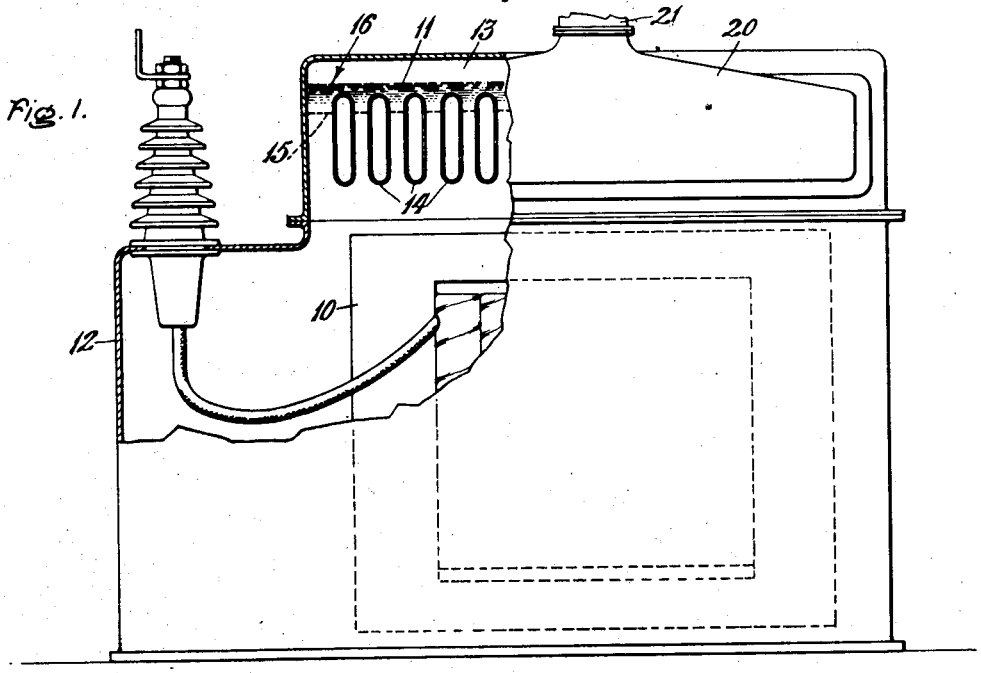
Figure 2:
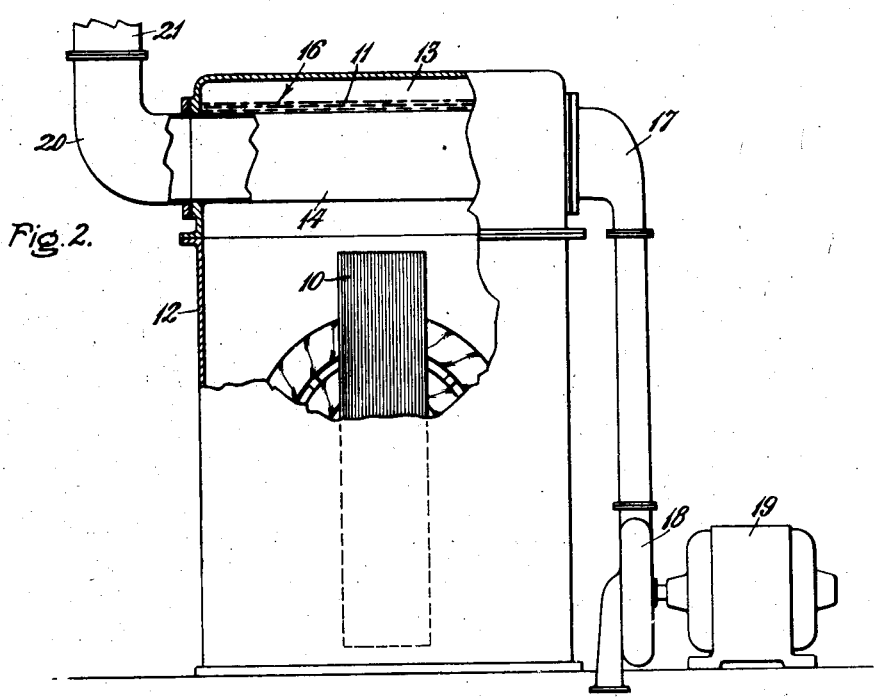

The invention will be better understood from the following description taken in connection with the accompanying drawing in which Fig. 1 shows a liquid-immersed transformer constructed in accordance with my invention, part of the casing being broken away to reveal details, and Fig. 2 is another view of the transformer shown in Fig. 1, part of the casing being also broken away to reveal details.

Like reference characters indicate similar parts in both figures of the drawing.

The transformer 10, shown in the drawing, is immersed in a body of insulating and cooling liquid 11 contained in a metal casing 12. The liquid 11 will expand and contract in response to changes in temperature and the space 13 above the liquid, preferably filled with an inert gas, such as dry nitrogen, is provided to permit such expansion and contraction of the liquid. The casing 12 may be sealed from the outside air, the volume of the space 13 being sufficient to prevent excessive pressure under maximum conditions of temperature and expansion of the liquid.

A plurality of metal tubes 14 are arranged horizontally in the upper part of the liquid 11 above the transformer 10. Each of these tubes extends through opposite side walls of the casing 12 and thus communicates at each end with the outside air. The tubes 14 are parallel to each other and spaced apart, and are preferably flattened with their greatest diameters arranged vertically. They are also preferably arranged so that their upper edges extend above the level 15 of the liquid 11 when the liquid is cold but so that they are completely immersed in the liquid and below its level 16 when the liquid is fully expanded and the transformer is carrying its maximum safe load. The ends of the tubes 14, opening through one side of the transformer casing 12, are covered by a manifold 17 which is connected to a blower or fan 18 operated by a motor 19. Cooling air may thus be forced through the tubes 14 by the blower 18. An outlet manifold 20 and pipe 21 may be provided if desired to conduct away the air from the other ends of the tubes where they open through the opposite wall of the casing 12.

During operation of the transformer, the losses in the transformer appear as heat, which is absorbed by the adjacent liquid 11. This heated liquid rises by convection toward the top of the casing 12 where it passes along the surfaces of the tubes 14. The heat is absorbed by the tubes and finally by the cooling air flowing through them, this air carrying the heat rapidly away. The cooled liquid then descends along the walls of the casing to the bottom of the transformer where it is ready to rise again and absorb more heat from the transformer.

With the arrangement which has been described, the cooling tubes 14 are located entirely in the upper, and therefore the hottest, part of the liquid 11 where there is the greatest difference in temperature between the tubes and the liquid and where the heat-absorbing efficiency of the tubes is therefore greatest. When the transformer is carrying full load and the liquid 11 is fully expanded, it is desirable that the level of the liquid be slightly above the upper edges of the tubes. When the transformer is carrying no load, or only partial load, so that the liquid 11 is only partially expanded, then the upper edges of the tubes 14 may extend above the level of the liquid because under these conditions their maximum heat-absorbing efficiency is not necessary.

The invention has been explained by describing and illustrating a particular arrangement for effectively cooling a liquid-immersed transformer but it will be obvious that changes may be made without departing from the spirit of the invention and the scope of the appended claims.

What I claim as new and desire to secure by Letters Patent of the United States, is:—

1. The combination with a transformer immersed in a cooling liquid within a casing, of a gas space above the liquid, whereby the level of the liquid will vary in response to temperature changes of the liquid, a plurality of spaced tubes arranged horizontally in the upper part of said liquid and opening through opposite sides of the casing, the upper portions of the tubes being located between the maximum and the minimum levels of the liquid, and means for blowing cooling air through the tubes.

2. The combination with a transformer immersed in a cooling liquid within a casing, of a gas space above the liquid, whereby the level of the liquid will vary in response to temperature changes of the liquid, a plurality of spaced flattened tubes arranged horizontally in the upper part of said liquid and opening through opposite sides of the casing, the tubes being located with their upper edges between the maximum and minimum levels of the liquid and with their greatest diameters vertical, and means for blowing cooling air through the tubes.

LOCKE H. BURNHAM.